(12) United States Patent
Jamison et al.

(10) Patent No.: US 9,074,699 B2
(45) Date of Patent: Jul. 7, 2015

(54) MULTI-PORT NORMALLY OPEN MODULAR VALVE WITH THREAD-IN SEAT

(71) Applicant: MAC Valves, Inc., Wixom, MI (US)

(72) Inventors: Michael Jamison, Fenton, MI (US); Jeffrey Simmonds, Commerce Township, MI (US)

(73) Assignee: MAC Valves, Inc., Wixom, MI (US)

( * ) Notice: Subject to any disclaimer, the term of this patent is extended or adjusted under 35 U.S.C. 154(b) by 185 days.

(21) Appl. No.: 13/724,455

(22) Filed: Dec. 21, 2012

(65) Prior Publication Data
US 2014/0175312 A1 Jun. 26, 2014

(51) Int. Cl.
| | |
|---|---|
| F16K 11/07 | (2006.01) |
| F16K 31/02 | (2006.01) |
| F16K 1/34 | (2006.01) |
| F16K 11/044 | (2006.01) |
| F16K 27/02 | (2006.01) |

(52) U.S. Cl.
CPC . *F16K 31/02* (2013.01); *F16K 1/34* (2013.01); *F16K 11/044* (2013.01); *F16K 27/029* (2013.01)

(58) Field of Classification Search
CPC .. F16K 31/0655; F16K 31/0644; F16K 31/06
USPC ........... 251/129.02, 129.15, 129.18; 192/112; 137/625.48
See application file for complete search history.

(56) References Cited

U.S. PATENT DOCUMENTS

| | | | | |
|---|---|---|---|---|
| 1,049,845 | A * | 1/1913 | Geissinger | 251/80 |
| 1,389,056 | A * | 8/1921 | Lane | 251/129.02 |
| 3,552,714 | A * | 1/1971 | Manville | 251/88 |
| 4,074,700 | A * | 2/1978 | Engle | 137/625.27 |
| 4,530,486 | A * | 7/1985 | Rusnak | 251/129.17 |
| 5,413,308 | A * | 5/1995 | Hayes | 251/77 |
| 5,474,107 | A * | 12/1995 | Hayes | 137/625.5 |
| 6,631,881 | B2 * | 10/2003 | Weldon et al. | 251/129.02 |
| 6,929,240 | B2 * | 8/2005 | Ueda | 251/129.02 |
| 8,151,824 | B2 * | 4/2012 | Williams et al. | 137/625.69 |

OTHER PUBLICATIONS

Merriam-Webster, "Integral". Dec. 4, 2014.*

* cited by examiner

*Primary Examiner* — Kevin Murphy
*Assistant Examiner* — R. K. Arundale
(74) *Attorney, Agent, or Firm* — Harness, Dickey & Pierce, P.L.C.

(57) ABSTRACT

A normally open solenoid operated modular valve includes a solenoid body receiving a coil and pole piece. A polymeric material valve body portion is releasably connected to the solenoid body. An armature/valve member slidably disposed in both the solenoid body and the valve body portion has a male threaded end shank. A polymeric material thread-in poppet/valve member includes an internal threaded portion engaging the male threaded end shank to retain the thread-in poppet/valve member on the armature/valve member. A resilient material valve ring is retained on the thread-in poppet/ valve member. A cylindrical tube portion receives an armature/valve member rod portion. A biasing member acts against the armature/valve member and thereby acts to normally bias the valve ring away from contact with a valve seat surface created in the valve body portion defining a modular valve normally open position.

25 Claims, 7 Drawing Sheets

MULTI-PORT NORMALLY OPEN MODULAR VALVE WITH THREAD-IN SEAT

FIELD

The present disclosure relates to solenoid operated poppet valves.

BACKGROUND

This section provides background information related to the present disclosure which is not necessarily prior art.

Solenoid operated valves such as poppet valves are known which provide control of a fluid such as pressurized air in operating additional equipment such as sorters, packaging machines, food processors, and the like. These valves may be operated for millions of cycles. In order to retain the solenoid operated valve in a closed position when the solenoid is de-energized, biasing members such as springs are used. It is also known, for example in U.S. Pat. No. 4,598,736 to Chorkey, that fluid pressure can be balanced within the valve to reduce a solenoid force required to move a valve member between closed and open positions.

Direct access to the valve seat area in known valves is generally not available. When wear of the valve member or seat occurs, known valve designs either require the entire valve to be disassembled or the valve is entirely replaced. Valve designs having snap-in component parts for easier access to valve components are known, but do not provide flexibility in changing valve operating characteristics.

SUMMARY

This section provides a general summary of the disclosure, and is not a comprehensive disclosure of its full scope or all of its features.

According to several aspects, a normally open solenoid operated modular valve includes a solenoid body receiving both a coil and a pole piece. A valve body portion is releasably connected to the solenoid body. An armature/valve member within the valve body portion has a threaded end shank. A thread-in poppet/valve member includes a threaded portion engaging the threaded end shank to retain the thread-in poppet/valve member on the armature/valve member. A valve ring is retained on the thread-in poppet/valve member. A biasing member acts against the armature/valve member to normally bias the valve ring away from contact with a valve seat surface created in the valve body portion, thereby creating a valve normally open position of the modular valve.

According to other aspects, a normally open solenoid operated modular valve includes a solenoid body receiving both a coil and a pole piece. A valve body portion is releasably connected to the solenoid body. An armature/valve member is slidably disposed in both the solenoid body and the valve body portion and has a male threaded end shank. A thread-in poppet/valve member includes an internal threaded portion engaging the male threaded end shank to retain the thread-in poppet/valve member on the armature/valve member. A resilient material valve ring is retained on the thread-in poppet/ valve member. A cylindrical tube portion receives a rod portion of the armature/valve member. A biasing member acts against the armature/valve member and thereby acts to normally bias the valve ring away from contact with a valve seat surface created in the valve body portion thereby defining a valve normally open position of the modular valve.

According to further aspects, a normally open solenoid operated modular valve includes a solenoid body receiving both a coil and a pole piece. A polymeric material valve body portion is releasably connected to the solenoid body. An armature/valve member slidably disposed in the modular valve includes a male threaded end shank and a rod portion. A thread-in poppet/valve member includes an internal threaded portion engaging the male threaded end shank to retain the thread-in poppet/valve member on the armature/valve member. A resilient material valve ring is retained on the thread-in poppet/valve member. A cylindrical tube portion receives the rod portion of the armature/valve member. A resilient material seal member is positioned in a slot created in the rod portion creating a fluid barrier between the rod portion and an inner wall of an inner bore of the cylindrical tube portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figures 1, 2:
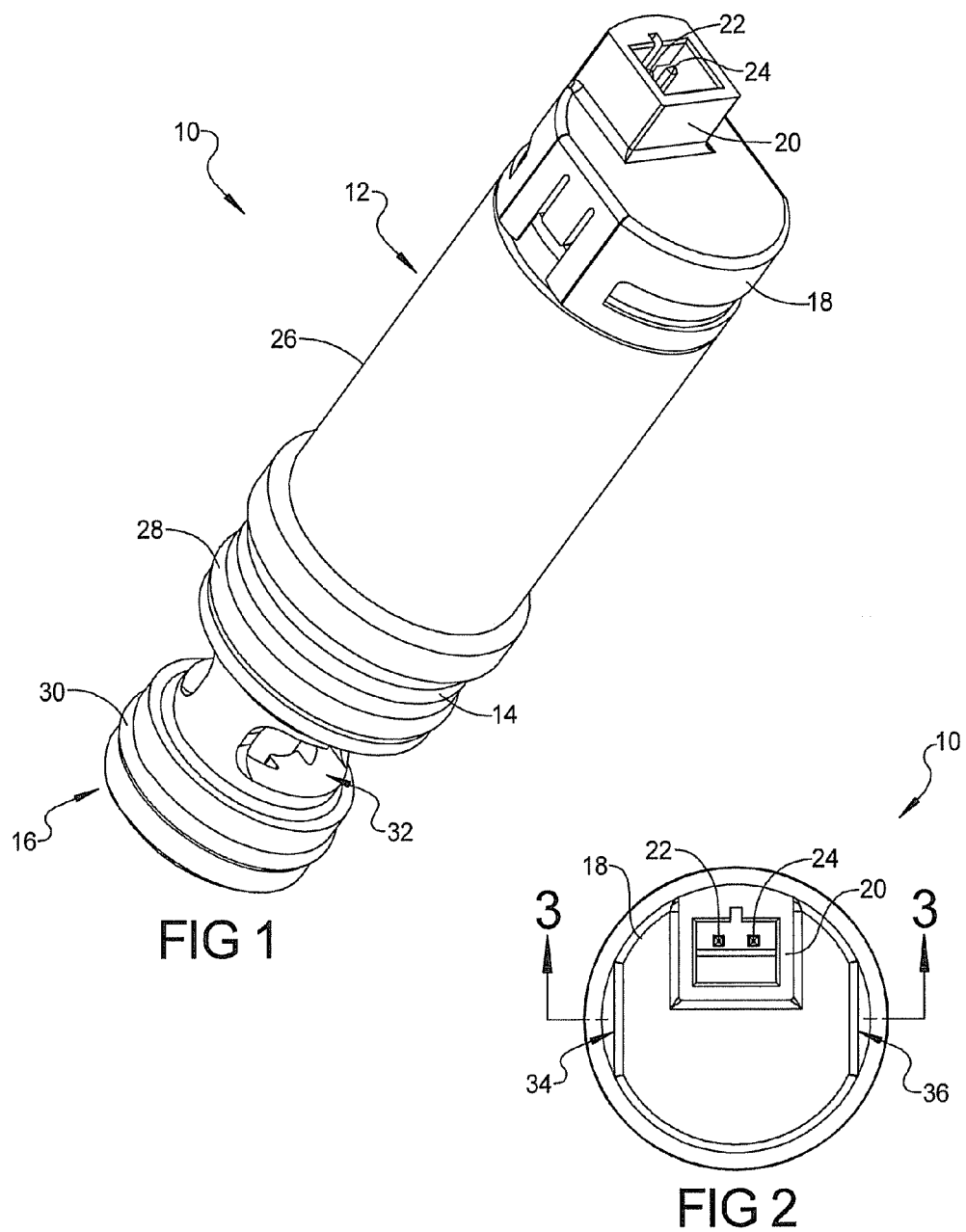
FIG. 1 is a top front perspective view of a multi-port normally open modular valve of the present disclosure.
FIG. 2 is a top plan view of the modular valve of FIG. 1.
Figure 6:
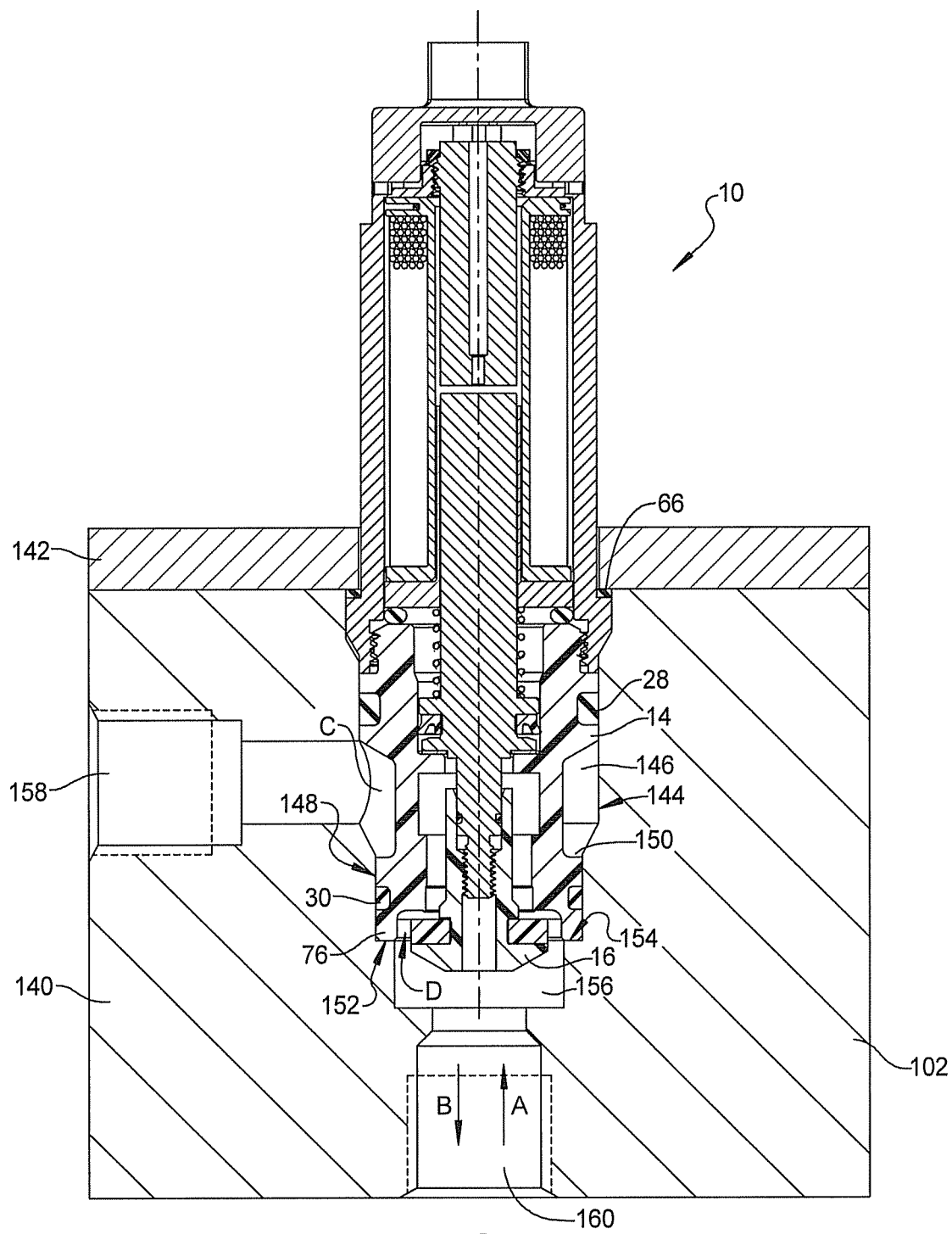
FIG. 6 is a front elevational cross sectional view similar to FIG. 3 further showing the modular valve installed in a manifold assembly.

Referring to FIG. 1, a multi-port normally open modular valve 10 includes a solenoid portion 12 releasably connected to a polymeric material valve portion 14. A thread-in poppet/ valve member 16 is releasably connected to modular valve 10 at a free end of the valve portion 14. An end cover 18 is attached to solenoid portion 12 which provides a connecting port 20 having multiple electrical connectors 22, 24 providing electrical power to operate solenoid portion 12. The solenoid portion 12 includes a solenoid can 26 which houses a solenoid assembly shown and described in reference to FIG. 2. The valve portion 14 is provided with a first seal member 28 and a second seal member 30 such as O-rings or D-rings. The first and second seal members 28, 30 are oppositely positioned about a valve inlet port 32 and will be functionally further described in reference to FIG. 6.

Referring to FIG. 2, modular valve 10 can include opposed end cover flats 34, 36 to assist in installation of modular valve 10. The electrical connectors 22, 24 are axially aligned with respect to the solenoid portion 12 such that electrical connection to modular valve 10 can be made within the space envelope of end cover 18. This minimizes the space envelope of modular valve 10 to maximize its side-to-side alignment with multiple other modular valves 10 in a configuration such as in a manifold assembly, shown and described in greater detail in reference to FIG. 6.

Referring to FIG. 3 and again to FIG. 1, the components of a solenoid assembly 37 within the solenoid portion 12 include a solenoid coil 38 which is contained in a bobbin 40. When energized, the solenoid coil 38 creates a magnetic field acting through an axially adjustable but normally stationary pole piece 42. Pole piece 42 includes a threaded end 44 which is engaged with a threaded aperture 45 of a solenoid can 26, allowing the axial position of pole piece 42 to be manually adjusted by rotation of pole piece 42. Pole piece 42 can also include an axial bore 48 providing a vent path through pole piece 42. A clearance gap 50 is provided between pole piece 42 and a combination armature/valve member 52 with modular valve 10 in a normally open position shown. The clearance provided by clearance gap 50 allows armature/valve member 52 to displace from the normally open position to a closed position. Both armature/valve member 52 and pole piece 42 are coaxially aligned with and independently displaced with respect to a longitudinal central axis 54 of modular valve 10. The magnetic field when created by energizing solenoid coil 38 acts through pole piece 42 to axially displace armature/valve member 52 in a first direction "A" from its normally open downwardly displaced position shown, coaxial with respect to the longitudinal central axis 54, to close modular valve 10. Continuous operation of solenoid coil 38 is therefore required to maintain modular valve 10 in the valve closed position.

Armature/valve member 52 is slidably guided within a cylinder sleeve 56 positioned within bobbin 40. A flange 58 is integrally connected to and is transversely oriented with respect to cylinder sleeve 56. Flange 58 is captured between a bobbin end wall 60 and a resilient material seal member 62 such as an O-ring. When seal member 62 is partially compressed by contact with a first body end 64 of valve portion 14 a biasing force of seal member 62 retains the position of flange 58 and therefore bobbin 40. An end seal member 66 such as an O-ring or D-ring is also provided at an outwardly extending body flange 68, whose function will be described in reference to FIG. 6. First body end 64 of valve portion 14 is releasably engaged to solenoid can 26 using a threaded connection 70. The first and second seal members 28, 30 are individually retained in first and second slots 72, 74 created at opposite ends of valve portion 14. First slot 72 is created in first body end 64 and second slot 74 is created in a second body end 76.

A biasing member 78 such as a compression spring in direct contact against flange 58 normally provides a biasing force acting in a second direction "B" opposite to first direction "A", which holds the armature/valve member 52 in a normally open position shown. Armature/valve member 52 includes a valve member portion 80 positioned predominantly within valve portion 14 which is threadably coupled to a tubular portion 82 of thread-in poppet/valve member 16. According to several aspects, valve portion 14 is made of a polymeric material, reducing both a weight and a cost of modular valve 10. Tubular portion 82 and valve member portion 80 are each positioned in a fluid passage 84 of valve portion 14 and are therefore exposed to a fluid such as water, air, or pneumatic fluid controlled by operation of modular valve 10. A resilient material valve ring 86 is retained between a first ring retainer 88 and a second ring retainer 89 both outwardly radially extending integral portions of thread-in poppet/valve member 16. Valve ring 86 is used in a valve closed position (shown in FIG. 5) to isolate fluid in a valve inlet port "C" from a valve outlet port "D". In the valve open position shown, fluid in valve inlet port "C" is in communication with valve outlet port "D".

Figure 3:
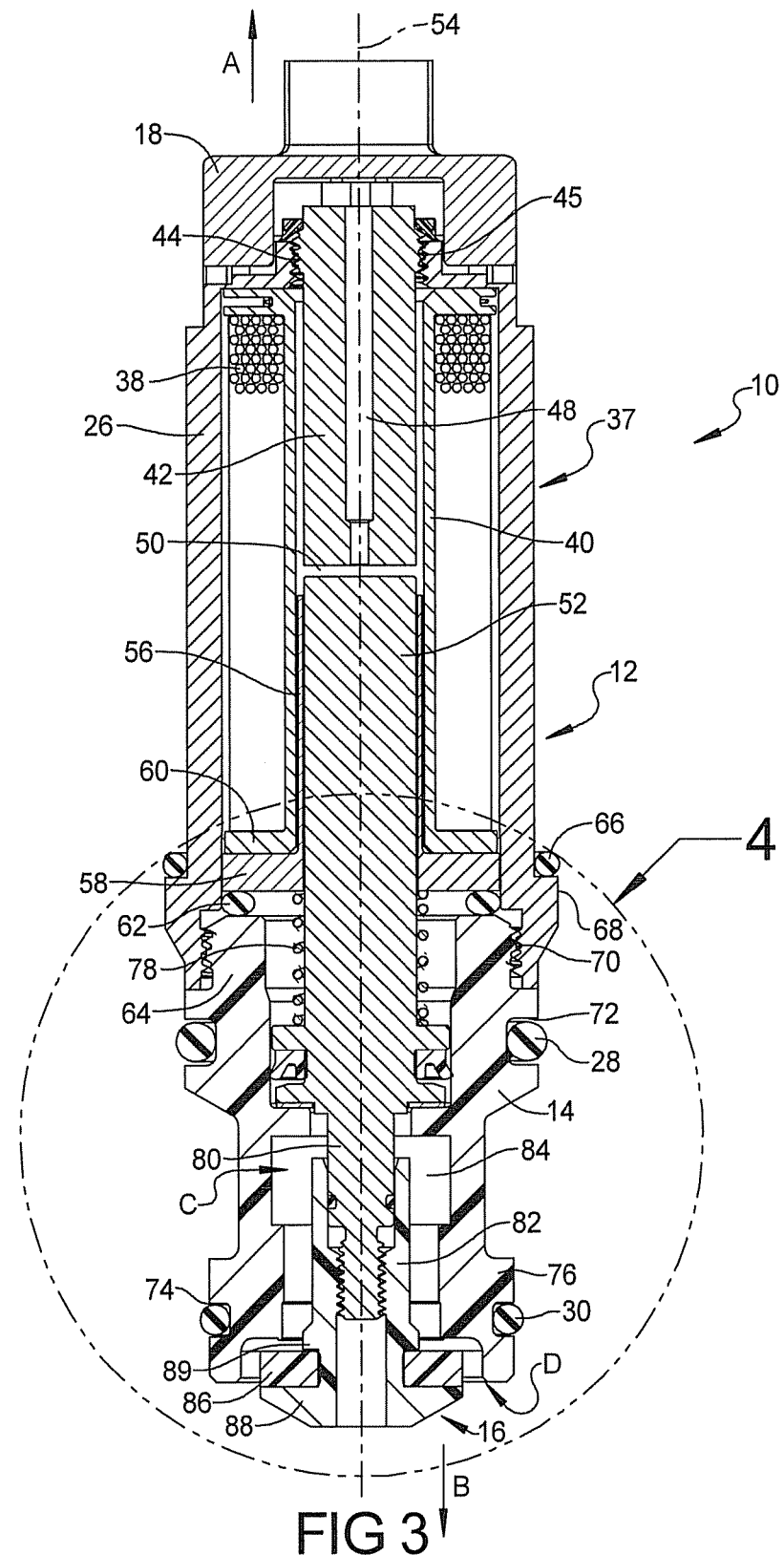
FIG. 3 is a front elevational cross sectional view taken at section 3 of FIG. 2.

Referring to FIG. 4 and again to FIG. 3, the biasing member 78 is received concentrically about armature/valve member 52 and is in direct contact at a first end with a flange face 90 of flange 58, and at a second end with a piston 92. Piston 92 is an integral portion of armature/valve member 52 which is slidably received in a piston cylinder portion 94 of valve portion 14, and slidably displaces in each of the first and second directions "A" and "B". The biasing force of biasing member 78 normally acts to displace piston 92 and thereby armature/valve member 52 in the second direction "B". A resilient material seal member 96 is provided in a seal ring 98 of piston 92 which is in sliding contact with a bore wall 100 of piston cylinder portion 94 to prevent fluid present in inlet port "C" from reaching the solenoid components of modular valve 10 contained in solenoid can 26. When modular valve 10 is in the normally open position shown, an end face 102 of inwardly extending wall 104 of valve portion 14 directly contacts is seated against a compressible seal 103 seated on piston 92.

An open passage 106 created through wall 104 provides clearance for a rod portion 108 of armature/valve member 52 to extend into inlet port "C". The rod portion 108 has a diameter "E" which is sized to slidably fit within a cylindrical tube portion 110 of thread-in poppet/valve member 16. A resilient material seal member 112 such as an O-ring or D-ring is provided in a receiving slot 113 created in circular rod portion 108 which provides a fluid boundary seal against an inner wall 114 of an inner bore 115 of cylindrical tube portion 110. Seal member 112 thereby acts to prevent fluid present in inlet port "C" from flowing out of modular valve 10 via inner bore 115. The cylindrical tube portion 110 of thread-in poppet/valve member 16 is sized to slidably fit within a smallest diameter portion 116 of inlet port "C".

The armature/valve member 52 further includes an end shank 118 having male threads 120 created thereon. The male threads 120 are mated with female threads 122 provided in an internal threaded portion 124 of thread-in poppet/valve member 16. The longitudinal position of thread-in poppet/valve member 16 with respect to longitudinal central axis 54 can be adjusted by axial rotation of thread-in poppet/valve member 16 with respect to male threads 120. The valve ring 86 is held in position on thread-in poppet/valve member 16 by direct contact with a flange face 125 of an end flange 126 integrally provided with thread-in poppet/valve member 16 and oppositely by direct contact with a ring face 128 of second retainer ring 89 also integrally provided with thread-in poppet/valve member 16. The valve ring 86 is therefore retained between end flange 126 and ring face 128 as armature/valve member 52 displaces in the first and second directions "A", "B".

In the valve normally open position shown, the piston 92 of armature/valve member 52 is maintained in direct contact with compressible seal 103 by the biasing force of biasing member 78. This biasing action positions a flat contact surface 130 of valve ring 86 at a seat clearance distance "F" away from a valve seat surface 132 created in valve portion 14. A fluid flow passage 134 is thereby opened between valve inlet port "C" and an outlet passage 136 defining valve outlet port "D".

As previously noted, the seat clearance distance "F" is adjustable to increase or decrease seat clearance distance "F" by axial rotation of thread-in poppet/valve member 16 with respect to male threads 120 of armature/valve member 52. A valve opening/closing time and/or a valve stroke is also controlled by the seat clearance distance "F". Because thread-in poppet/valve member 16 is accessible to an operator of modular valve 10, adjustment of the seat clearance distance "F" is provided any time the modular valve 10 is not in an installed position. As valve ring 86 wears over time and use, thread-in poppet/valve member 16 can be axially adjusted in the first direction "A" to accommodate the wear, or removed in the second direction "B" coaxial to longitudinal central axis 54 and replaced by a new thread-in poppet/valve member 16 or with a new valve ring 86 by displacement in first direction "A".

Figure 4:
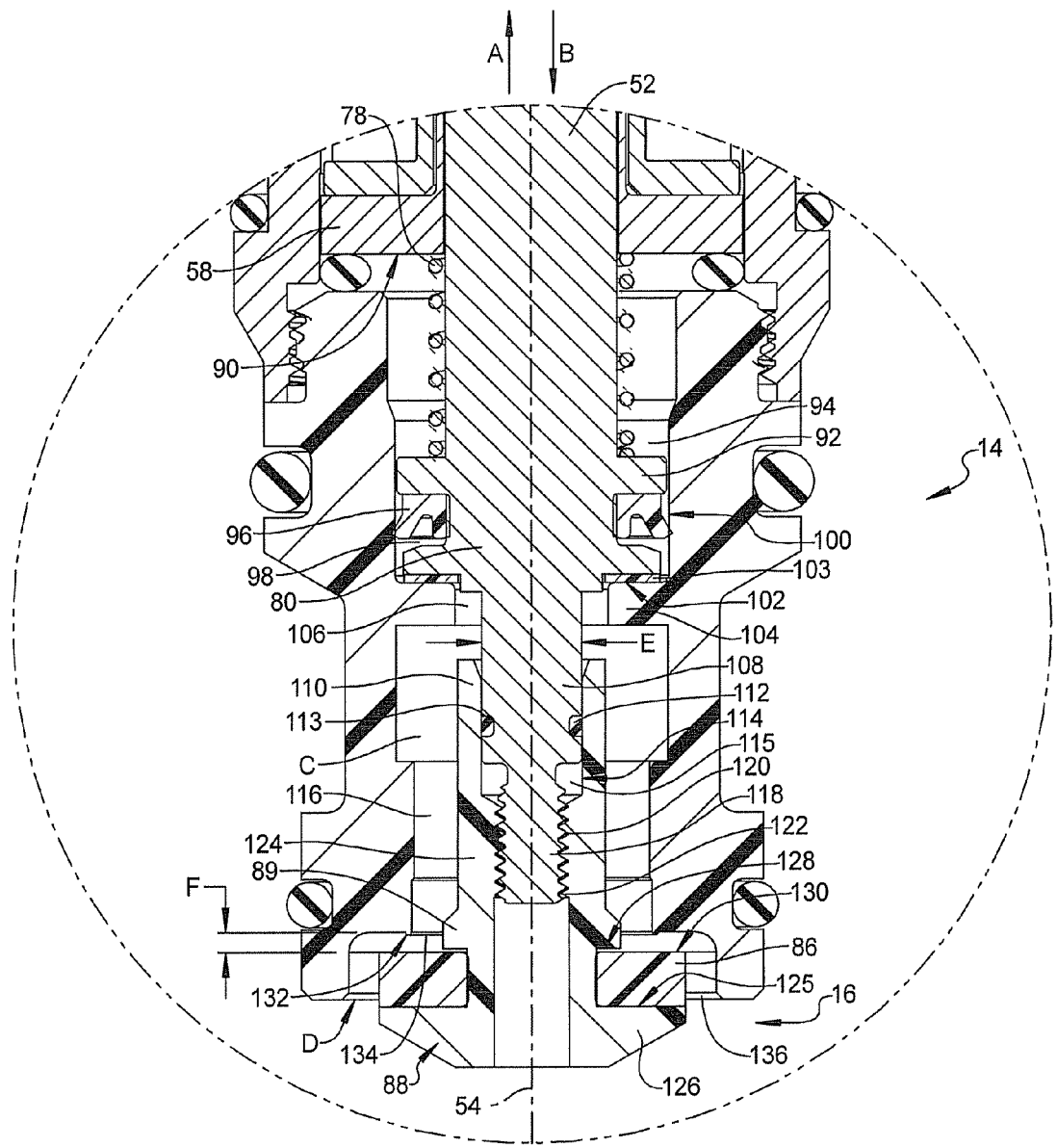
FIG. 4 is a front elevational cross sectional view taken at area 4 of FIG. 3 showing the modular valve in its normally open position.

Referring to FIG. 5 and again to FIGS. 3-4, modular valve 10 is shown in a valve closed position reached when solenoid coil 38 is energized thereby pulling armature/valve member 52 in the first direction "A", and simultaneously compressing biasing member 78. Inwardly extended wall 104 displaces away from contact with compressible seal 103. Valve inlet port "C" is isolated from valve outlet port "D" when the flat contact surface 130 of valve ring 86 directly contacts the valve seat surface 132 created in valve portion 14. As previously noted, modular valve 10 is held in the valve closed position as long as the solenoid coil 38 is energized. When solenoid coil 38 is de-energized, the biasing force of biasing member 78 returns the armature/valve member 52 and thread-in poppet/valve member 16 in the second direction "B" to the valve open position shown in FIGS. 3-4.

Figure 5:
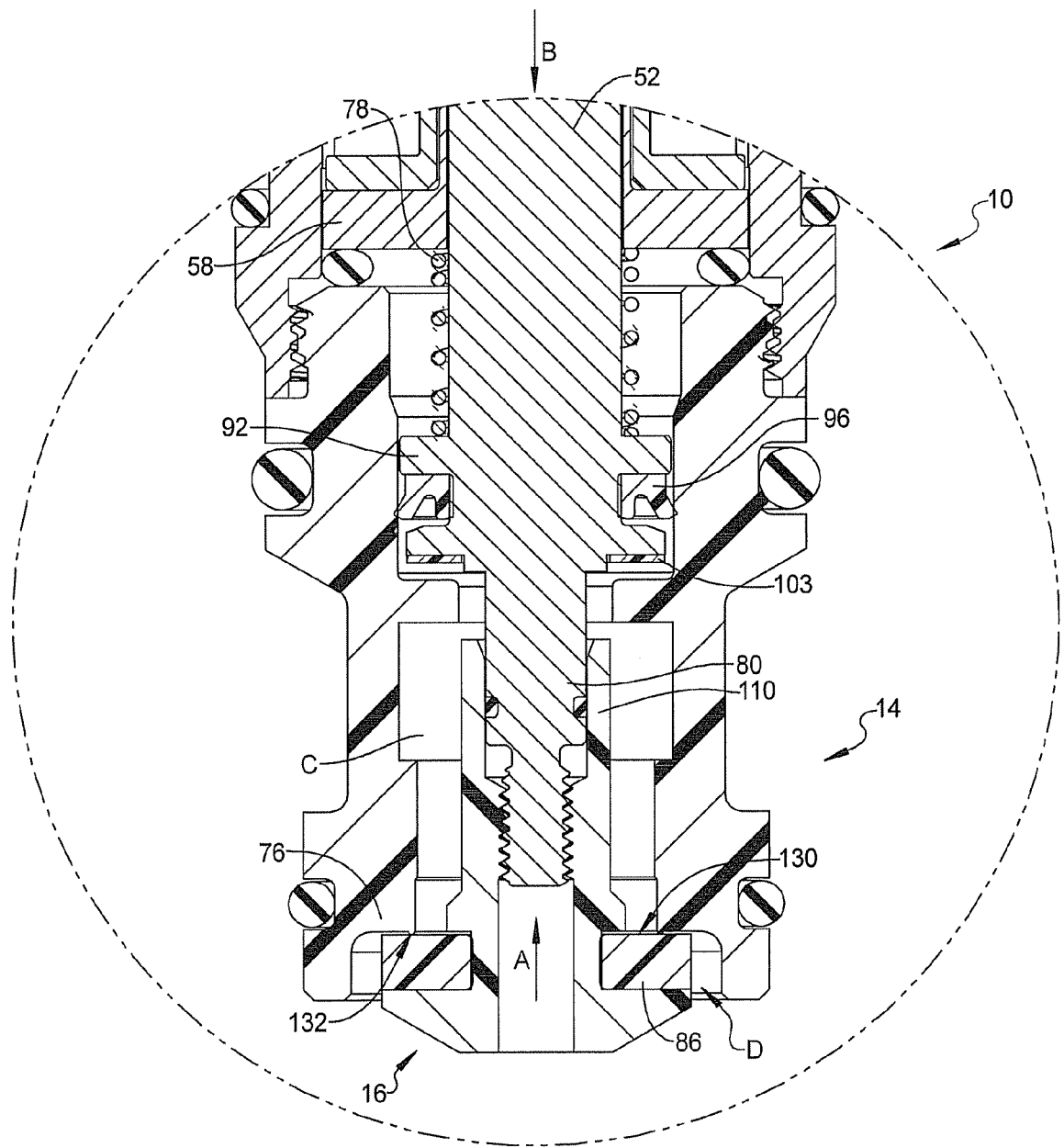
FIG. 5 is a front elevational cross sectional view similar to FIG. 4 further showing the modular valve in a closed position.

Referring to FIG. 6 and again to FIGS. 3-5, in a typical installation, a two-way version of modular valve 10 is shown with modular valve 10 installed in a manifold 140. Modular valve 10 is received through an aperture of and retained by a hold down plate 142. Hold down plate 142 directly contacts manifold 140 and partially compresses end seal member 66, thereby providing a biasing force holding modular valve 10 in the fully installed position shown. The valve portion 14 is received in contact with a bore wall 144 of a main cavity 146 of manifold 140 and sealed therein by first seal member 28. The second body end 76 of valve portion 14 is slidably received in contact with a bore wall 148 of a second cavity 150 of manifold 140 and sealed by second seal member 30. A free end 152 of valve portion 14 directly contacts an end wall 154 of second cavity 150, fixing the installed position of modular valve 10. The thread-in poppet/valve member 16 is positioned within a flow passage 156 of manifold 140 and is free to axially displace therein. With modular valve 10 in the normally open position shown, the inlet port "C" is in communication with an inlet connecting port 158 of manifold 140, and the outlet port "D" is in communication with an outlet connecting port 160 of manifold 140.

Figure 7:
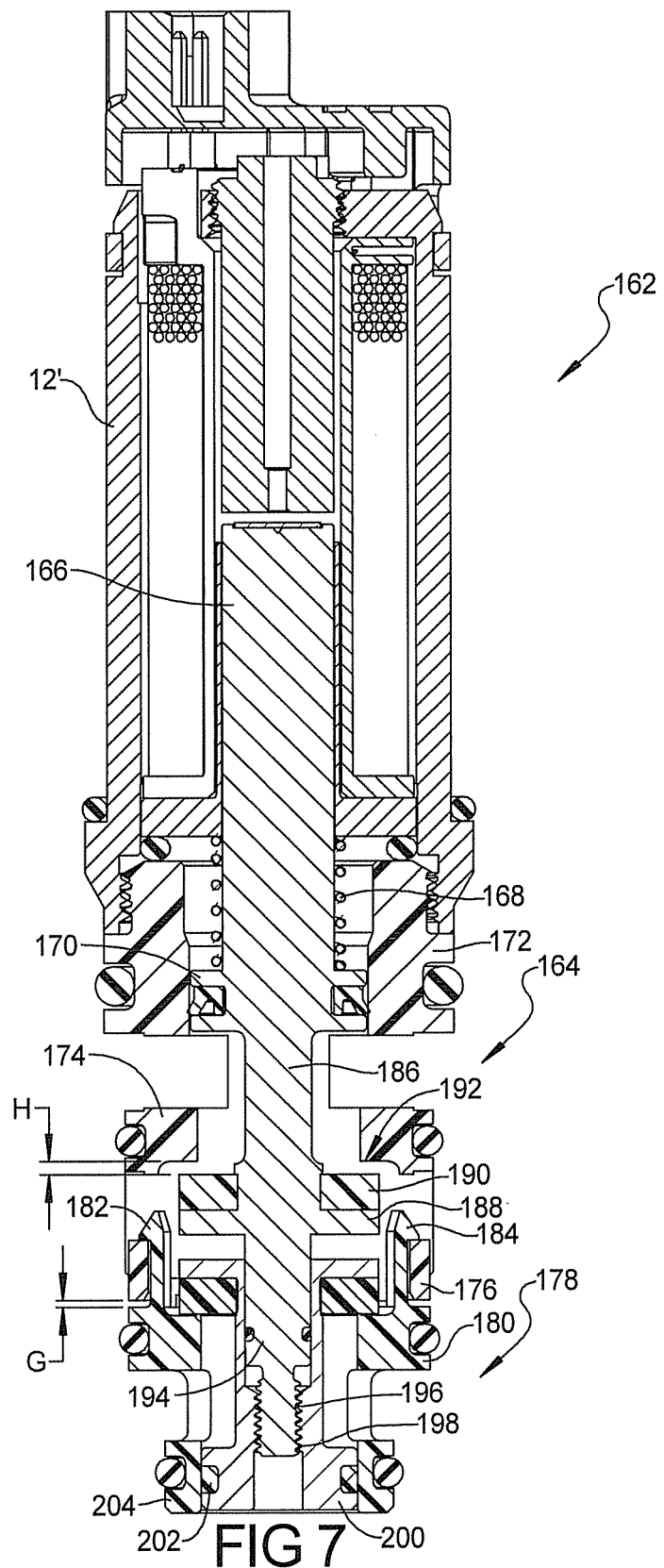
FIG. 7 is a front elevational cross sectional view similar to FIG. 3 of a 3-way multi-port normally open modular valve of the present disclosure.

Referring to FIG. 7 and again to FIGS. 1 and 3-6, a three-way version of a normally open modular valve 162 includes many of the same solenoid components as modular valve 10. The components of the solenoid assembly within the solenoid portion 12' are substantially identical and are therefore not further discussed herein. A polymeric material valve portion 164 is threadably connected to solenoid portion 12'. A clearance gap similar to clearance gap 50 is similarly provided between the pole piece and a combination armature/valve member 166 with modular valve 162 in a normally open position shown. The clearance provided by the clearance gap allows armature/valve member 166 to displace from the normally open position to a closed position.

Figure 8:
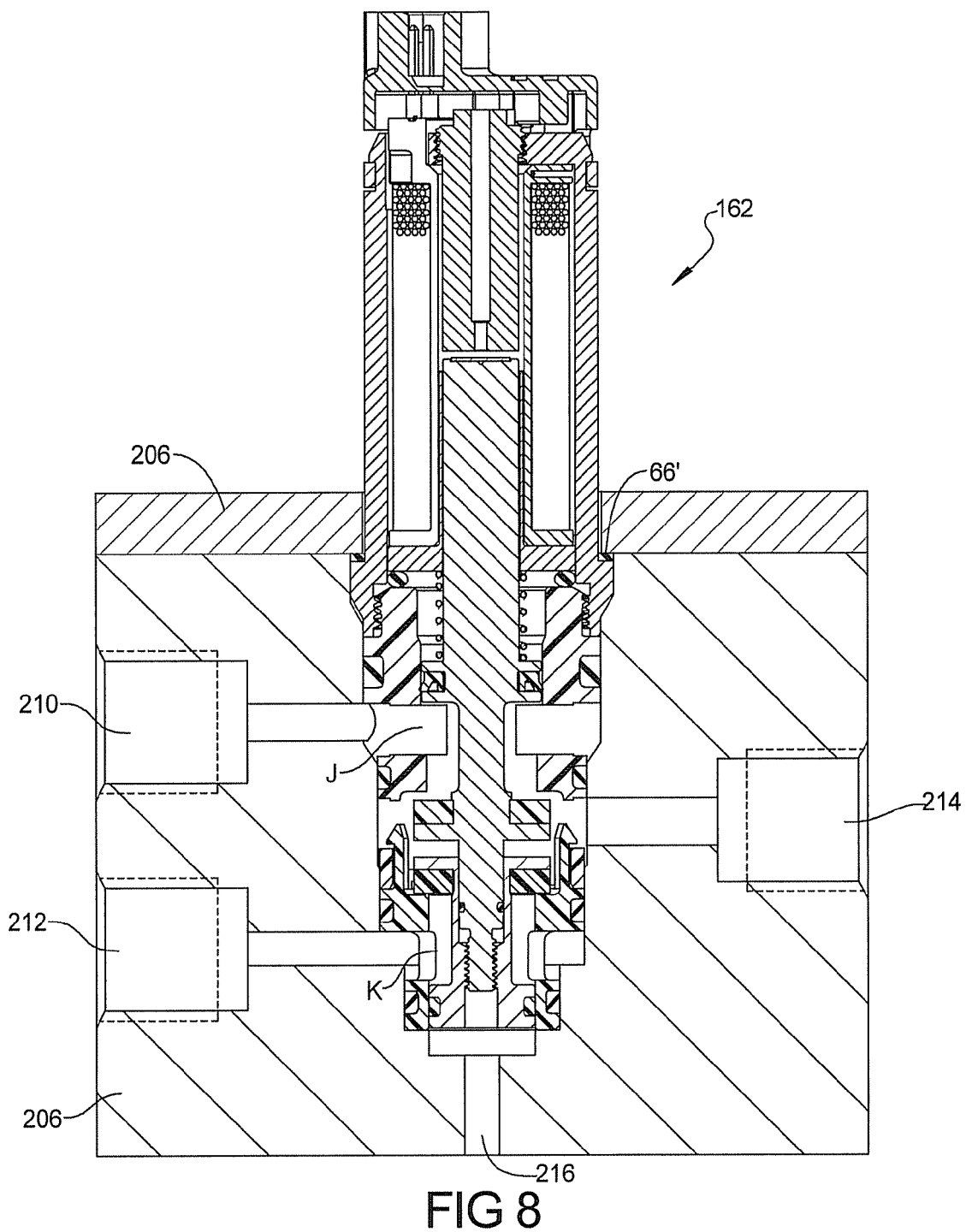
FIG. 8 is a front elevational cross sectional view similar to FIG. 6 showing the 3-way modular valve installed in a manifold assembly.

Armature/valve member 166 is normally biased similar to armature/valve member 52 using a biasing member 168 positioned in direct contact with an integral, radially extending piston 170 of armature/valve member 166. Piston 170 is slidably guided within an upper or first body portion 172 of valve portion 164. A lower or second body portion 174 is an integral extension of first body portion 172, and further includes a body end portion 176. A cartridge assembly 178 is releasably connected to body end portion 176. Cartridge assembly 178 includes a polymeric material snap-in cartridge portion 180 that integrally includes opposed first and second barbs 182, 184 that initially deflect upon installation into body end portion 176 and then snap outwardly to engage body end portion 176. In the assembled but un-installed condition of modular valve 162, a clearance "G" is provided between the snap-in portion 180 and body end portion 176 due to the biasing force of biasing member 168. Clearance "G" is substantially eliminated when modular valve 168 is installed such as in a manifold as described in reference to FIG. 8.

Armature/valve member 166 further includes a rod portion 186 extending integrally from piston 170, from which a first radial flange 188 outwardly extends. A resilient material first valve ring 190 is retained by radial flange 188. In the valve open position shown, first valve ring 190 is separated by a ring clearance "H" from a first seat surface 192 created in second body portion 174. Armature/valve member 166 also includes a valve member portion 194 which is functionally similar to valve member portion 80, positioned predominantly within valve portion 164 which includes a male threaded end shank 196 threadably coupled to an internally threaded tubular portion 198 of a thread-in poppet/valve member portion 200 of cartridge assembly 178. According to several aspects, the snap-in cartridge portion 180 is made of a polymeric material, reducing both a weight and a cost of modular valve 10. A seal member 202 such as an O-ring or a D-ring is provided with thread-in poppet/valve member portion 200 to seal against a cylinder end 204 of snap-in cartridge portion 180 when thread-in poppet/valve member 200 is slidably received within snap-in cartridge portion 180.

Poppet/valve member 200 additionally includes a second radial flange 205 which supports a resilient material second valve ring 206. In the valve open position, second valve ring 206 is seated against a second seat surface 208 created in snap-in cartridge portion 180. The male threaded end shank 196 threadably coupled to internally threaded tubular portion 198 of thread-in poppet/valve member portion 200 allows the thread-in poppet/valve member 200 to be axially adjusted by rotation of thread-in poppet/valve member 200. The valve throw or ring clearance "H" can thereby be adjusted with modular valve 162 in the assembled, but un-installed condition.

Referring to FIG. 8, and again to FIGS. 3-7, in a typical installation, the three-way version of modular valve 162 is shown with modular valve 162 installed in a manifold 210. Modular valve 162 is received through an aperture of and retained by a hold down plate 212. Hold down plate 212 directly contacts manifold 210 and partially compresses end seal member 66', thereby providing a biasing force holding modular valve 162 in the fully installed position shown. Installation of modular valve 162 is otherwise substantially similar to the installation of modular valve 10 in manifold 140. A free end of valve portion 164 directly contacts an end wall of a second cavity of manifold 210, fixing the installed position of modular valve 162. The thread-in poppet/valve member 200 and the snap-in cartridge portion 180 are positioned within a flow passage of manifold 210 and the thread-in poppet/valve member 200 is adjustable to axially displace therein. To allow axial displacement of poppet/valve member 200, the manifold 210 is provided with a vent passage 220 aligned with poppet/valve member 20 which is open to atmosphere. With modular valve 162 in the normally open position shown, the inlet port "J" is in communication with an inlet connecting port 214 of manifold 210, and the outlet port "L" is in communication with an outlet connecting port 218 of manifold 210. The exhaust port "K" is in communication with an exhaust connecting port 216, which are isolated from the inlet port "J" and outlet port "L" in the normally open valve position. Modular valve 162 may also be used in the normally closed position, by using port "J" as the exhaust port and using port "K" as the inlet port.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A normally open solenoid operated modular valve, comprising:
    a solenoid body receiving both a coil and a pole piece;
    a valve body portion connected to the solenoid body, the valve body portion defining a valve seat surface;
    an armature/valve member including a valve member portion and a threaded end shank, each positioned in the valve body portion;
    a thread-in poppet/valve member having a valve ring and a one-piece body, the valve ring having an engagement surface facing the solenoid body that moves into sealing contact with the valve seat surface of the valve body portion in response to movement of the armature/valve member, and wherein the one-piece body comprises:
        a free end body portion retaining a that carries the valve ring on the thread-in poppet/valve member where the valve ring extends about and is retained on the free end body portion; and
        an internal threaded portion extending longitudinally from the free end body portion toward the solenoid body where the internal threaded portion is positioned longitudinally between the free end body portion and the valve member portion of the armature/valve member, the internal threaded portion receiving the threaded end shank of the armature/valve member to retain the thread-in poppet/valve member on the armature/valve member;
    and a biasing member acting against the armature/valve member to normally bias the valve ring away from contact with the valve seat surface of the valve body portion thereby defining a valve normally open position of the modular valve.

2. The normally open solenoid operated modular valve of claim 1, wherein the solenoid body further includes a bobbin supporting the coil and having the pole piece slidably received in the bobbin.

3. The normally open solenoid operated modular valve of claim 2, wherein the pole piece is movably positioned in the bobbin and further includes a threaded end engaging the pole piece to the solenoid body permitting an axial position of the pole piece to be selected by rotation of the pole piece with respect to the threaded end.

4. The normally open solenoid operated modular valve of claim 1, wherein the thread-in poppet/valve member includes a cylindrical tube portion slidably receiving an unthreaded rod portion of the armature/valve member, the unthreaded rod portion positioned proximate to the threaded end shank.

5. The normally open solenoid operated modular valve of claim 4, wherein the unthreaded rod portion includes a seal member slidably contacting an inner wall of the cylindrical tube portion preventing fluid in the modular valve from exiting past the threaded end shank of the armature/valve member.

6. The normally open solenoid operated modular valve of claim 1, wherein the armature/valve member is slidably disposed in both the solenoid body and the valve body portion and is displaced toward the pole piece by a magnetic field created by the coil when the coil is energized and acting through the armature/valve member and the pole piece thereby compressing the biasing member until the valve ring of the thread-in poppet/valve member contacts the valve seat surface defining a valve closed position.

7. The normally open solenoid operated modular valve of claim 1, wherein the modular valve is a 2-way valve.

8. The normally open solenoid operated modular valve of claim 1, wherein the modular valve is a 3-way valve having the thread-in poppet/valve member provided having a snap-in cartridge portion and a thread-in cartridge portion.

9. The normally open solenoid operated modular valve of claim 8, wherein the snap-in cartridge portion includes opposed first and second barbs engaging the snap-in cartridge portion to the valve body portion.

10. The normally open solenoid operated modular valve of claim 1, further including a manifold having a manifold bore receiving the modular valve and a modular bore end face, wherein the valve body portion directly contacts a seat body end face of the manifold bore end face.

11. The normally open solenoid operated modular valve of claim 1, wherein the thread-in poppet/valve member includes first and second ring retainers having the valve ring positioned between the first and second ring retainers.

12. The normally open solenoid operated modular valve of claim 1, wherein in the normally open position the valve ring is spaced from the valve seat surface defining a seat clearance distance, the seat clearance distance being adjustable by rotation of the thread-in poppet/valve member with respect to the threaded end shank of the armature/valve member acting to axially displace the thread-in poppet/valve member.

13. The normally open solenoid operated modular valve of claim 1, wherein the valve body portion is a polymeric material.

14. The normally open solenoid operated modular valve of claim 1, wherein the thread-in poppet/valve member is a polymeric material and the valve ring is a resilient material.

15. A normally open solenoid operated modular valve, comprising:
   a solenoid body receiving both a coil and a pole piece;
   a polymeric material valve body portion releasably connected to the solenoid body;
   an armature/valve member slidably disposed in the modular valve and having an unthreaded rod portion and a male threaded end shank;
   a polymeric material thread-in poppet/valve member having a resilient material valve ring and a one-piece body, the one-piece body comprising:
      a free end portion that carries the resilient material valve ring on the thread-in poppet/valve member where the resilient material valve ring extends about and is retained on the free end portion;
      an internal threaded portion extending longitudinally from the free end portion towards the solenoid body that receives the male threaded end shank to retain the thread-in poppet/valve member on the armature/valve member; and
      an open end portion extending longitudinally from the internal threaded portion toward the solenoid body to define a cylindrical tube, the cylindrical tube having a smooth bore adjacent the internal threaded portion that receives the unthreaded rod portion of the armature/valve member; and
   a biasing member acting against the armature/valve member and thereby acting to normally bias the valve ring away from contact with a valve seat surface created in the valve body portion thereby defining a valve normally open position of the modular valve.

16. The normally open solenoid operated modular valve of claim 15, wherein the armature/valve member is slidably disposed in both the solenoid body and the valve body portion, the armature/valve member displaced toward the pole piece by a magnetic field created when the coil is energized.

17. The solenoid operated modular valve of claim 16, wherein the armature/valve member includes a piston slidably received in a piston cylinder portion of the valve body portion.

18. The solenoid operated modular valve of claim 17, wherein a valve seal member is supported on the piston in sliding contact with a bore wall of the piston cylinder portion, the valve seal member isolating a fluid in the modular valve from the solenoid body.

19. The solenoid operated modular valve of claim 17, wherein the biasing member is positioned between and in contact with both the piston and a flange of a cylinder sleeve axially guiding the armature/valve member.

20. The normally open solenoid operated modular valve of claim 15, wherein the internal threaded portion of the one-piece body is positioned longitudinally between the free end portion and the open end portion of the one-piece body.

21. The normally open solenoid operated modular valve of claim 15, wherein the unthreaded rod portion of the armature/valve member has a diameter that is sized to slidably fit within the cylindrical tube of the open end portion.

22. A normally open solenoid operated modular valve, comprising:
   a solenoid body receiving both a coil and a pole piece;
   a polymeric material valve body portion releasably connected to the solenoid body;
   an armature/valve member slidably disposed in the modular valve and having a male threaded end shank and an unthreaded rod portion;
   a polymeric material thread-in poppet/valve member having an integral body, comprising:
      an internal threaded portion engaging the male threaded end shank to adjustably position the thread-in poppet/valve member on the armature/valve member;
      a free end portion retaining a resilient material valve ring on the thread-in poppet/valve member; and
      an open end portion defining a cylindrical tube for receiving the unthreaded rod portion of the armature/valve member; and a resilient material seal member positioned in a slot created in the unthreaded rod portion creating a fluid barrier between the unthreaded rod portion and an inner wall of an inner bore of the cylindrical tube.

23. The normally open solenoid operated modular valve of claim 22, further including a biasing member acting against the armature/valve member and thereby acting to normally bias the valve ring away from contact with a valve seat surface created in the valve body portion thereby defining a valve normally open position of the modular valve.

24. A normally open solenoid operated modular valve, comprising:
   a solenoid body receiving both a coil and a pole piece;
   a polymeric material valve body portion releasably connected to the solenoid body;
   an armature/valve member slidably disposed in the modular valve and having a male threaded end shank and a rod portion;
   a polymeric material thread-in poppet/valve member having:
      an internal threaded portion engaging the male threaded end shank to adjustably position the thread-in poppet/valve member on the armature/valve member;
      a resilient material valve ring retained on the thread-in poppet/valve member; and
      a cylindrical tube portion receiving the rod portion of the armature/valve member; and
   a resilient material seal member positioned in a slot created in the rod portion creating a fluid barrier between the rod portion and an inner wall of an inner bore of the cylindrical tube portion,
   wherein the armature/valve member further includes an integrally connected piston slidably received in a piston bore of the valve body portion.

25. A normally open solenoid operated modular valve, comprising:
   a solenoid body receiving both a coil and a pole piece;
   a polymeric material valve body portion releasably connected to the solenoid body;
   an armature/valve member slidably disposed in the modular valve and having a male threaded end shank and a rod portion;
   a polymeric material thread-in poppet/valve member having:
      an internal threaded portion engaging the male threaded end shank to adjustably position the thread-in poppet/valve member on the armature/valve member;
      a resilient material valve ring retained on the thread-in poppet/valve member; and
      a cylindrical tube portion receiving the rod portion of the armature/valve member; and
   a resilient material seal member positioned in a slot created in the rod portion creating a fluid barrier between the rod portion and an inner wall of an inner bore of the cylindrical tube portion,
   wherein an axial position of the pole piece is adjusted using threads created on the pole piece to axially move the pole piece with respect to the solenoid body, wherein axial displacement of the pole piece creates a clearance between the pole piece and the armature/valve member defining a valve stroke length.

\* \* \* \* \*

UNITED STATES PATENT AND TRADEMARK OFFICE
CERTIFICATE OF CORRECTION

| | | |
|---|---|---|
| PATENT NO. | : 9,074,699 B2 | Page 1 of 1 |
| APPLICATION NO. | : 13/724455 | |
| DATED | : July 7, 2015 | |
| INVENTOR(S) | : Michael Jamison et al. | |

It is certified that error appears in the above-identified patent and that said Letters Patent is hereby corrected as shown below:

In the specification,

Column 6, Line 18 Delete "168" and insert --162--, therefor

Column 7, Line 3 Delete "20" and insert --200--, therefor

In the claims,

Column 8, Claim 1, Line 46, delete "retaining a"

Signed and Sealed this
Fifteenth Day of March, 2016

Michelle K. Lee
*Director of the United States Patent and Trademark Office*